Figure 1:
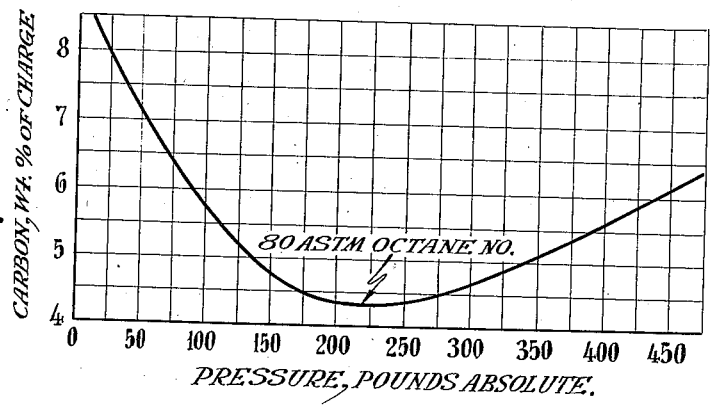
Figure 2:
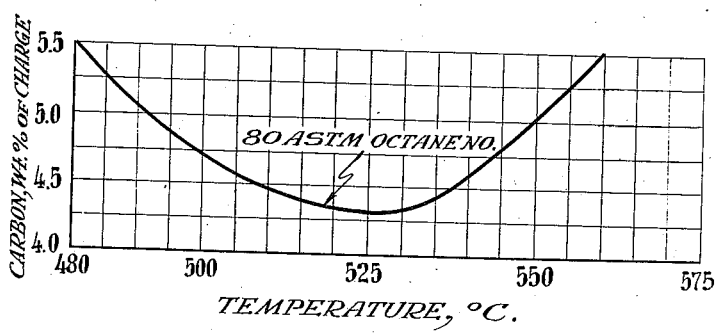
Figure 3:
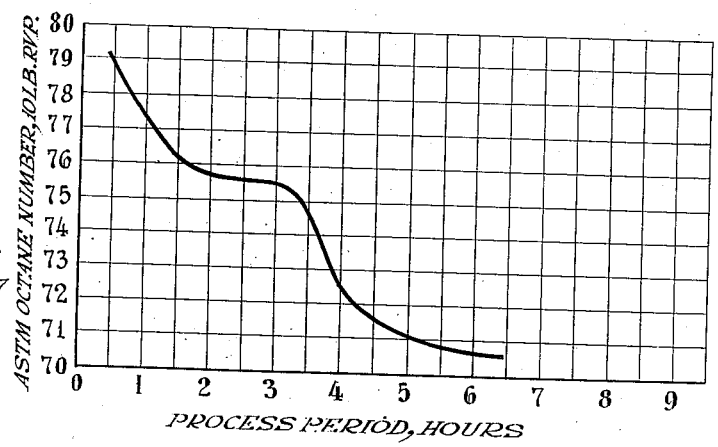

April 10, 1945.  W. J. MATTOX  2,373,254

CATALYTIC REFORMING

Filed May 9, 1942

REFORMING
STRAIGHT RUN
NAPHTHA
TEMPERATURE: 525°C
PROCESS PERIOD:
3 HOURS

REFORMING
STRAIGHT RUN
NAPHTHA
PRESSURE:
215 PSI ABSOLUTE
PROCESS PERIOD:
3 HOURS

REFORMING
STRAIGHT RUN
NAPHTHA
PRESSURE:
215 PSI ABSOLUTE
TEMPERATURE: 525°C
WEIGHT SPACE VELOCITY: 0.7

Inventor
William J. Mattox
By Lee J. Gary
Attorney.

Patented Apr. 10, 1945

2,373,254

UNITED STATES PATENT OFFICE 2,373,254

CATALYTIC REFORMING

William J. Mattox, Chicago, Ill., assignor to Universal Oil Products Company, Chicago, Ill., a corporation of Delaware Application May 9, 1942, Serial No. 442,313

6 Claims. (Cl. 196—50)

This invention relates to the catalytic reforming of straight-run gasolines and naphthas. In a more specific sense, the invention is concerned with the reforming of naphtha fractions at optimum conditions of temperature, pressure, etc. to produce a high octane number reformate with minimum production of catalyst deposit.

Previous experience in catalytic cracking or reforming has indicated that an increase in the processing pressure generaly results in an increase in the amount of carbon which is formed on the catalyst during the conversion reaction. For this reason it has been preferred to conduct these processes at relatively low pressures, usually of the order of 5–30 pounds per square inch gauge. Whenever higher pressures have been employed it has usually been the custom to dilute the charge material with a suitable vaporous diluent such as steam, hydrogen or light hydrocarbon gases in order to reduce the partial pressure of the hydrocarbon oil charge so that the amount of carbon on the catalyst will not be excessive.

However, I have found that in the catalytic reforming of gasoline or naphtha certain optimum conditions of temperature, space velocity, and process period will permit the use of high pressures within a certain range without resulting in excessive carbon formation and without having to resort to the use of diluent gases. According to my invention, therefore, reforming of gasolines and naphthas is effected at temperatures ranging from about 500 to about 550° C., at pressures ranging from about 150 to about 300 pounds per square inch absolute at weight space velocities ranging from about 0.2 to about 1.0, and for process periods not substantially exceeding three hours in length. Weight space velocity is defined as the hourly weight ratio of oil to catalyst, that is, a weight space velocity of 1.0 means that 1 part by weight of catalyst is contacted with 1 part by weight of oil per hour.

The catalysts which are employed in the process of my invention comprise oxides of the elements of the left hand column of Groups V and VI of the periodic table deposited on refractory oxide supports. The most suitable dehydrogenating oxides of those in the periodic group mentioned above are the oxides of chromium, molybdenum and vanadium, since these oxides are especially efficient in catalyzing dehydrogenating reactions without catalyzing scission of carbon to carbon bonds. Various refractory oxide supports may be employed, alumina and magnesia being among the most suitable. In some instances certain siliceous supports such as those of the clay type may also be employed either alone or in conjunction with the alumina or magnesia previously mentioned.

In one specific embodiment the present invention comprises a process for increasing the octane number of a naphtha fraction by dehydrogenation which comprises contacting said naphtha in the absence of added hydrogen or other diluents with a reforming catalyst comprising one or more oxides of the metals of the left hand column of Groups V and VI of the periodic table deposited on a refractory oxide support at a temperature of from about 500 to 550° C. at a pressure of from about 150 to about 300 pounds per square inch absolute, at a weight space velocity of from about 0.2 to about 1.0, and for a process period not substantially exceeding three hours in length.

The process of the present invention may be carried out according to several alternative methods of operation. For example, the hydrocarbon vapors may be passed through a fixed bed of granular catalyst at the desired pressure and temperature, etc., and the carbonaceous deposits left on the catalyst by the conversion reaction may be removed intermittently by passing oxygen containing gases through the catalyst bed. According to another method of operation, powdered catalysts may be added to a flowing stream of liquid or vaporous hydrocarbons and the mixture passed through an elongated heated reaction zone. According to still a third method of operation, the hydrocarbon reactants may be bubbled upward through a turbulent bed of powdered catalyst. In the second and third methods of operation, the catalyst may be continuously removed from the reaction zone and regenerated in an exterior regeneration zone. In the third method regeneration may be accomplished in situ as in the fixed bed process by interrupting the flow of hydrocarbons and contacting the catalyst with oxygen containing gas.

The catalysts employed in this process may be prepared according to a number of alternatives. For example, the refractory oxide support may be impregnated with a solution of a compound which will yield the desired dehydrogenating oxide on evaporation of the solvent and calcination of the dried material. According to another method of preparation, a slurry of alumina hydrogel is saturated with a solution of a compound which will yield the catalytic oxide on subsequent calcination, and the entire material is partly dehydrated, mixed with clay if desired, extruded, and then calcined at 500–900° C. Various other conventional methods of preparation of these catalysts may be employed if desired.

The curves on the accompanying drawing show the relationship between carbon on the catalyst and other process variables and illustrate that at the conditions at which the process of this invention is operated a minimum of carbon is produced. For purposes of comparison, an octane number level of 80 has been chosen for most of the curves so that the effect of temperature and pressure on carbon can readily be illustrated.

The catalyst which was employed to obtain the data illustrated on these curves was prepared as follows: A solution containing a compound of molybdenum was added to a suspension of alumina hydrogel, and the resulting mixture partly hydrated to a jelly-like mass. This mass was then combined with a clay to form a plastic mass which was extruded, dried, calcined, and reduced to form the final catalyst. The catalyst prepared in this manner contained approximately 9.6% by weight of molybdenum oxides measured as $MoO_3$ and approximately 20% clay on a dry basis, the balance being essentially alumina. The charging material, which was a Mid-continent straight run naphtha, was then passed over this catalyst at varying temperatures, pressures and space velocities to obtain the data which are illustrated on the curves. An analysis of this stock is presented below:

| | |
|---|---:|
| Gravity, ° A. P. I. at 60° F | 52.7 |
| A. S. T. M. O. N | 36.5 |
| H. C. analysis, weight per cent: | |
|   Paraffins+naphthenes | 90 |
|   Olefins | 0 |
|   Aromatics | 10 |
| Engler distillation: | |
|   I. B. P., °F | 221 |
|   10% | 261 |
|   30% | 288 |
|   50% | 312 |
|   70% | 336 |
|   90% | 368 |
|   95% | 380 |
|   E. P. ° F | 415 |
| Recovery ___per cent__ | 99.0 |
|   Residue _____do____ | 1.0 |
|   Loss _____do____ | 0.0 |

On Figure I accompanying, the effect of pressure on the amount of carbon deposited on the catalyst is shown for the production of an 80 octane number gasoline. This curve shows a definite minimum in the amount of carbon at about 225 pounds absolute at an average reaction temperature of 525° C. and for a total process period of three hours. On Figure II the effect of temperature at an average pressure of 215 pounds per square inch absolute and for a process period of three hours is illustrated showing the advantage of operating within the limits of from 500 to 550° C. Figure III shows the effect of process period length and demonstrates the impracticability of operating for process periods of longer than about three hours.

This process is, in general, applicable not only to the reforming of naphtha fractions, but also to dehydrogenation and aromatization of these fractions to produce fractions having a lower hydrogen content, and to produce aromatics. Pure hydrocarbons may also be converted by this process to olefins or aromatics.

I claim as my invention:

1. A process for the reforming of naphtha fractions to increase the octane number thereof which comprises contacting a naphtha fraction in the absence of added hydrogen with a catalyst comprising a dehydrogenating oxide deposited on a refractory support at a temperature of from about 500 to about 550° C., at a pressure of from about 150 to about 300 pounds per square inch absolute, at a weight space velocity of from about 0.2 to about 1.0, and for a process period not substantially in excess of three hours.

2. A process for increasing the aromatic content of a naphtha fraction which comprises contacting said fraction in the absence of added hydrogen with a catalyst comprising a dehydrogenating oxide deposited on a refractory support at a temperature of from about 500 to about 550° C., at a pressure from about 150 to about 300 pounds per square inch absolute, at a weight space velocity of from about 0.2 to about 1.0, and for a process period not substantially in excess of three hours.

3. The process as defined in claim 1 further characterized in that said catalyst comprises an oxide of an element from the left-hand column of Group V of the periodic table.

4. The process as defined in claim 1 further characterized in that said catalyst comprises an oxide of an element from the left-hand column of Group VI of the periodic table.

5. The process as defined in claim 2 further characterized in that said catalyst comprises an oxide of an element from the left-hand column of Group V of the periodic table.

6. The process as defined in claim 2 further characterized in that said catalyst comprises an oxide of an element from the left-hand column of Group VI of the periodic table.

WILLIAM J. MATTOX.